April 27, 1965     V. DEL ROSSO     3,180,475
HIGH SPEED CHECKWEIGHER
Filed Sept. 19, 1962     2 Sheets-Sheet 1
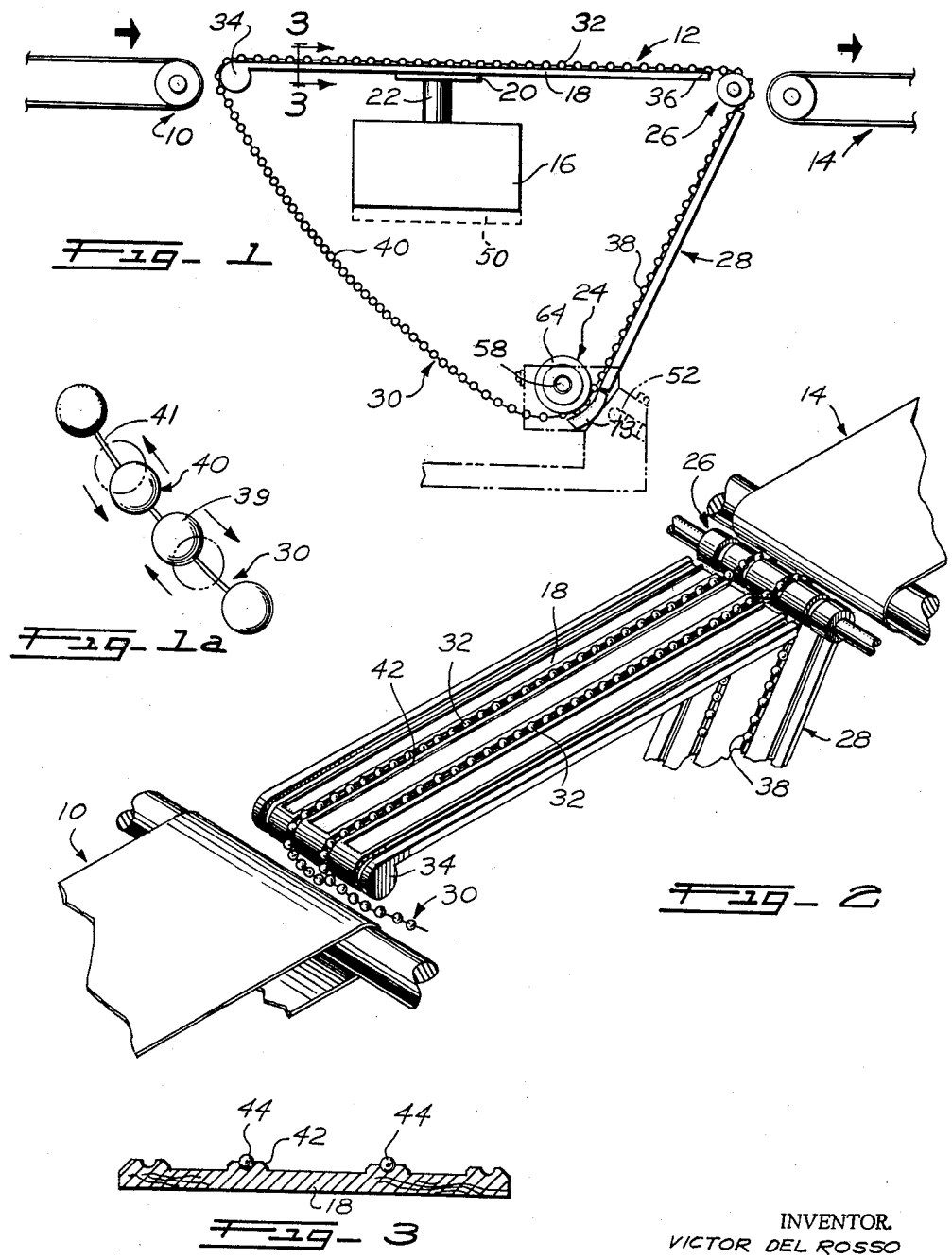
INVENTOR.
VICTOR DEL ROSSO
BY
Bean, Brooks, Buckley & Bean
ATTORNEYS April 27, 1965 V. DEL ROSSO 3,180,475
HIGH SPEED CHECKWEIGHER
Filed Sept. 19, 1962 2 Sheets-Sheet 2
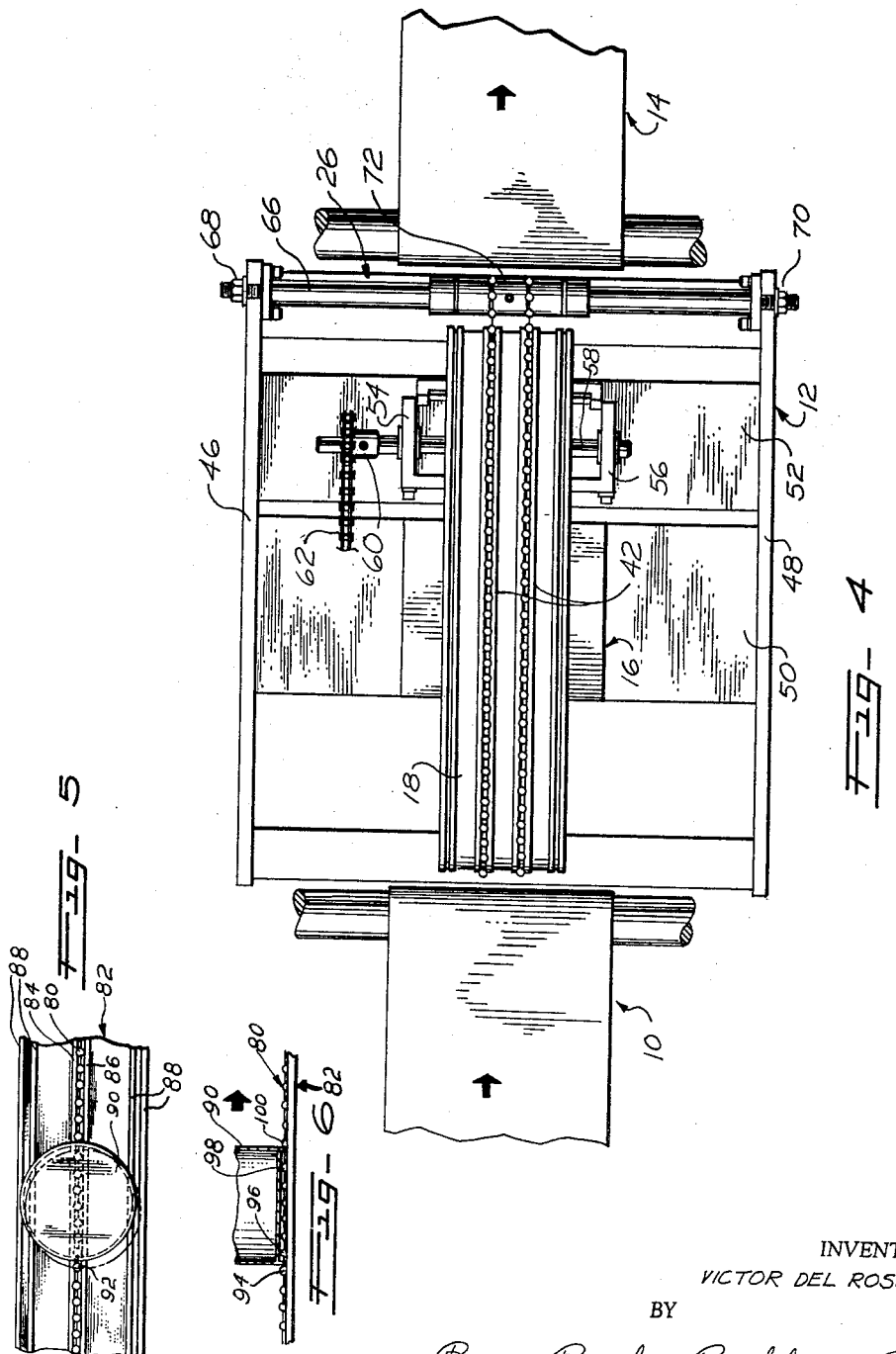
INVENTOR.
VICTOR DEL ROSSO
BY
Bean, Brooks, Buckley & Bean
ATTORNEYS

United States Patent Office 3,180,475
Patented Apr. 27, 1965

3,180,475
HIGH SPEED CHECKWEIGHER
Victor Del Rosso, Ithaca, N.Y., assignor to Hi-Speed Checkweigher Co., Inc., Ithaca, N.Y.
Filed Sept. 19, 1962, Ser. No. 224,692
7 Claims. (Cl. 198—39)

This invention relates to checkweighing apparatus and, in particular, pertains to certain improvments in high speed checkweighing apparatus as disclosed in my copending application Serial No. 87,421, filed February 6, 1961, now U.S. Patent 3,070,214, issued December 25, 1962.

The above mentioned copending application discloses a high speed checkweighing apparatus wherein a weighing platform is associated with a driven endless conveyor means in such fashion as to substantially obviate conveyor-induced vertical force components upon the platform, thereby permitting extremely accurate checkweighing even at high linear velocities. An important aspect of the system according to my copending application is that a portion of the length of the endless conveyor means rests directly upon the scale platform, passing freely over one end of the platform and being guided at the opposite end by a fixed member while another portion of the endless conveyor means, between the drive mechanism and the aforementioned end of the platform, is caused to run in slack condition. By this arrangement, the two mentioned portions of the endless conveyor means exert a substantially invariable and constant weight component upon the weight-sensitive platform. In order to assure proper operation, it will be appreciated that the endless conveyor means must be of substantial flexibility and, for this reason, thin belts of almost film-like constructions have been used. With such a belt, the slack condition mentioned can be maintained, free from any whipping or other deleterious motions even at extremely high linear velocities. However, there are certain disadvantages which may prevail, some of which may be overcome under any circumstances or conditions, others of which cannot be completely overcome under any circumstances or conditions, and still others of which will occur only under certain circumstances or conditions and which are not readily overcome when such conditions prevail. For example, the buildup of static electricity due to the fact that the material of the belt (Mylar, for example) is a good dielectric, can be overcome by the use of requisite equipment for discharging such electricity; whereas the inherent problem of tracking a slack belt cannot be completely eliminated without introducing ancillary problems such as excessive belt wear. On the other hand, if the equipment is operated in an excessively dusty atmosphere and/or the problem of product spillage becomes acute, foreign materials may build up on both the drive means and the belt to such an extent as to affect the accuracy of weighing, amplify the tracking problem and the like. Still further, since as above stated it is necessary, in order to obtain accurate weighing, that the belt be made of thin, relatively flexible material, short belt life is also an inherent factor.

It is, therefore, of principle concern in connection with this invention to provide specific improvements in the general system according to my copending application which eliminates the foregoing difficulties and which, generally speaking, permit of certain simplifications in the details of construction which are not inherently provided for in the previously disclosed system.

In particular, a specific embodiment of the present invention contemplates the use of a metallic bead chain and certain structural relationships in conjunction therewith which, in cooperative manner, overcome and eliminate all of the above problems.

Essentially, the present invention uses a bead chain endless conveyor means rigged, so to speak, in the fashion according to the aforementioned copending application, which specific type of endless conveyor means alone and in conjunction with certain ancillary structural features renders the basic system more practical and efficient, being particularly directed to the avoidance of the difficulties hereinbefore mentioned.

More specifically, the present invention utilizes, in a system as aforesaid, endless chain means as the conveying entity, the endless chain means being characterized as of the type which offers little frictional contact upon sliding across the weighing platform and as having a maximum degree of flexibility in all directions so as to inherently permit of accurate tracking even in that slack portion of the conveying means between the drive mechanism and receiving end of the weighing platform.

Further, it is an object of this invention to provide an endless conveyor means in the previously mentioned system which is effectively guided and laterally stabilized by the weighing platform and fixed guide means.

In accord with the present invention, one or more endless chains are used as the conveying means in the above-described combination. Whereas two or more chains would normally be utilized in conveying such articles as packages, boxes, cartons and the like, the present invention also contemplates the provision of but a single chain for conveying such articles as cans, for example. That is to say, the articles being conveyed may be wholly supported by the conveying means, entirely free of the platform over which they are traversed thereby, or the conveyed articles may be partially or even wholly supported by such platform, in which latter case the conveying means would impart only the motive force for conveying the articles. In any case, the chain-like conveying means inherently possesses good flexibility in the lateral direction so as to mitigate the problem of tracking and to otherwise form a practical and efficient improvement over the system according to my copending application, as aforesaid.

Other objects and advantages of the invention will appear from the description hereinbelow and the accompanying drawing wherein:

FIG. 1 is a diagrammatic elevational view illustrating the principles of the system according to the present invention;

FIG. 1a is a perspective view of a portion of one of the bead chains illustrating the flexible characteristic thereof;

FIG. 2 is a perspective view showing a portion of the system shown in FIG. 1;

FIG. 3 is an enlarged transverse sectional view taken through the weighing platform and illustrating the endless conveyor means and the guide grooves therefor;

FIG. 4 is a plan view of a check weighing mechanism according to the present invention;

FIG. 5 is a plan view of a single-chain conveyor particularly adapted for conveying cans; and FIG. 6 is a vertical section taken through the can shown in FIG. 5.

Referring at this time more particularly to FIG. 1, the reference character 10 indicates in general the discharge end of a conveying mechanism adapted to deliver articles one by one to the checkweighing mechanism indicated generally by reference character 12 and the conveyor mechanism shown partially at 14 represents such mechanism as receives the articles after having been checkweighed and discharged from the mechanism 12. The conveyor means 10 and 14 form no part of the present invention except insofar as they form a part of the over-all conveying system which includes the mechanism of the present invention.

The checkweighing assembly 12 consists essentially of weighing means 16 fixedly supported in a suitable manner and which weighing means includes a weighing platform 18 which is vertically movable to register the weight of articles passing over the assembly 12, the platform 18 receiving support by means of a suitable attaching plate 20 and post member 22 which also form part of the weighing means 16. A suitable support such as a frame member 50 mounts the main portion of the weighing means 16 and, in addition thereto, the frame, of which member 50 is a part, mounts a drive means 24 and a fixed guide element 26 as well as a guide plate indicated generally by reference character 28. The endless conveying means associated with the specific embodiment of the present invention according to FIGS. 1-4 comprises a plurality of bead chain members, one of which is indicated by reference character 30 in FIG. 1, and each such endless chain member has a horizontal flight portion 32 which is trained over a suitable guide portion 34 at the receiving end of the weighing platform 18 and extends throughout the major extent of the length of such flight portion in supported relationship upon the upper surface of the platform 18 and which passes linearly from the discharge end 36 of the platform 18 to pass over the fixed guide assembly 26.

It will be appreciated that with the arrangement as is shown, the greatest tension in the endless conveyor means will be present in that portion 38 thereof which extends between the drive means 24 and the guide 26, the horizontal flight portion 32 being under a lesser degree of tension due to the friction produced by the guide member 26. In any case, however, it will be appreciated that the tension throughout the conveyor means will fluctuate and vary as articles are fed onto, moved across and discharged from the weighing platform 18, the portion 40 of the conveying means which extends between the drive mechanism 24 and the receiving end 34 of the weighing platform 18 being in substantially slack condition under any circumstance of operation. In order to maintain a substantially uniform and unvarying downward weight component upon the scale platform 18 as occasioned by the weight of the horizontal flight portion 32 and the slack portion 40, it is essential that the slack portion 40 be free of any whipping tendencies and that also, the total length of the chain involved in the horizontal flight portion 32 and slack portion 40 remains substantially constant. To achieve these and other objectives hereinafter pointed out, the chain 30 in each case is preferably of the bead chain type wherein individual spheroids 39 are joined together in spaced relationship by intermediate link pin elements 41. FIG. 1a illustrates such a chain and as indicated therein, the beads 39 may slide on the link pins 41 and, as well, the universal connections therebetween contribute to a maximum of flexibility in all directions.

FIG. 2 illustrates more clearly the function wherein the chains 30 are trained directly over the receiving end 34 of the platform 18 so as to permit the aforesaid horizontal flight portion 40 to move up and down with the platform and thus maintain, with the portion 40, a substantially uniform and constant downward weight component on the weighing platform. FIG. 2 also clearly illustrates the principle that whereas the platform 18 may be provided on its upper surface with a plurality of chain guide strips 42, the checkweighing mechanism may be set up to provide a minimum of two conveying chains 30 or as many conveying chains as there are guide strips 42, the purpose being to accommodate for various types of articles being checkweighed. For example, more chains may be used to effectively increase the transverse width of the mechanism to accommodate for wider packages or the like and/or more chains may be utilized to decrease the unit bearing pressure of the chains against the upper surface of the platform to thus reduce the frictional drag of the individual chains.

As shown in FIG. 3, the guide strips 42 are grooved to receive the beads 44, the beads 44 being of transverse cross sectional profile complementing the shape of the grooves in the strips 42, the depths of the grooves being substantially less than the width of the beads so that the individual beads project a substantial distance above the uppermost area of the top surface of the weighing platform 18 and thus convey articles therealong out of direct contact with such platform.

Referring now more particularly to FIG. 4, it will be seen that the support or frame for the checkweighing assembly may conveniently include a pair of frame elements or uprights 46 and 48 which may carry therebetween a platform assembly 50 upon which the scale or weighing mechanism 16 is conveniently mounted. Additionally, these uprights 46 and 48 support a further platform 52 upon which is mounted the drive assembly 24. The drive assembly 24 comprises a frame including upright portions 54 and 56 rigid with the platform 52 and which carry suitable bearing or bushing means for rotatable support of the drive shaft 58. A sprocket or other driven element 60 affixed to the shaft 58 connects, through a suitable member such as a chain 62 to a drive motor (not shown) by means of which the proper speed of rotation of the drive shaft 58 is obtained. The drive shaft 58 removably carries thereon at least a pair of sprockets 64, see particularly FIG. 1, which are engaged with the individual chain assemblies 30. The fixed guide assembly 26 may conveniently take the form of a bar 66 detachably connected as by nuts 68 and 70 at its opposite ends to the side members 46 and 48 and which bar 66 carries a guide sleeve 72 fixed thereto. The guide sleeve 72 is provided with circumferentially extending grooves aligning with the grooves in the various guide strips 42 whereby a greater or lesser number of chains 30 may be accommodated for, as desired.

The frame assembly for the drive sprocket 64 mounts a series of guide elements or other means 73 (see FIG. 1) whereby the chains are maintained in operative engagement with their respective sprockets 64. In any case, it will be appreciated that any suitable means may be used for imparting proper and positive drive to the bead chains 30.

From the above, it will be clear that the conveyor means is, first of all, of substantial flexibility so that the portion 40 may run slack, which is necessary in order to obtain accurate weighing at high linear velocities. Further, the conveying means also possesses substantial lateral flexibility which, operating in conjunction with the guiding structure, eliminates the problem of tracking a slack member. Still further, the small dimensional characteristics of the conveyor means taken in conjunction with the flexibility in all directions (leading to self-cleaning action) substantially obviates any product or foreign material build up on the conveyor means. Further, the bead chain arrangement as shown, using spherical elements operating in conjunction with the requisite hemispherically-pocketed drive sprockets, also minimizes foreign material build up owing to the self cleaning action achieved as the chain engages the sprocket.

As shown in FIG. 5, the checkweighing system need employ only one endless conveyor member 80 and, as will presently appear, it may actually be desirable to utilize but a single member. In FIG. 5, a fragment 82 of the scale platform is shown, the same having, in the particular embodiment illustrated, a centrally disposed guide groove receiving the bead chain 80 with such groove being defined between the upstanding opposite sides 84 and 86 of the guide track structure. Support rails or guides 88, paralleling the groove or track structure and elevated above the main body of the platform by the same amount as on the side walls 84 and 86, serve to reduce frictional drag as the cans 90 are moved lengthwise of the platform.

A study of FIGS. 5 and 6 will readily reveal the desirability of providing the single chain 80 as opposed to two or more such chains. The full and dotted line positions of the can 90 in FIG. 5 illustrate, respectively, a perfectly centered relation between the can 90 and chain 80 and a laterally shifted position of the can 90 relative to the chain 80. In the dotted line position, it will be seen that the trailing edge point of the can would rest upon the bead 92 whereas in the full line position, the bottom edge lip of the can 90 is nested between accommodating ones of beads 94, 96 and 98, 100. The cans, as can be appreciated, will "seek" such positions. On the other hand, it will also be seen that if two or more chains 80 were used, only one size of can could be accommodated as in FIG. 6 with a given uniform spacing between the beads, and then only if the chains were to remain in proper lateral alignment with respect to each other. Although cylindrical cans are shown in FIGS. 5 and 6, it will be appreciated that square, rectangular and other shape cans can be most effectively transported according to the principles illustrated.

It is to be understood that certain changes and modifications as illustrated and described may be made without departing from the spirit of the invention or the scope of the following claims.

I claim:

1. A high speed checkweighing system comprising, in combination,
   a support,
   weighing means mounted on said support,
   said weighing means including a movable weighing platform having a receiving end and a discharge end,
   a guide member carried by said support adjacent the discharge end of said weighing platform,
   an endless chain member having a horizontal flight portion trained over and engaging the receiving end of said weighing platform, extending longitudinally thereof to derive support and lateral guiding therefrom and passing linearly from the discharge end of said weighing platform over said guide member,
   drive means on said support engaging said chain member, and
   said chain member being composed of a series of spaced, enlarged beads joined by tension elements therebetween.

2. The system as defined in claim 1 wherein each bead is of spheroidal form.

3. A high speed checkweighing system comprising, in combination,
   a support having weighing means thereon in which the weighing means includes a vertically movable platform,
   said weighing platform having a receiving end and a discharge end with there being a plurality of longitudinally extending guide grooves in the upper surface of said weighing platform,
   an endless bead chain member having a horizontal flight portion trained over the receiving end of the weighing platform and extending longitudinally thereon within an associated guide groove,
   said chain member comprising a series of spaced and joined enlarged beads of transverse sectional profile in part complementing the transverse profile of said guide groove, the groove being of less depth than the width of said beads whereby the beads project above the upper surface of said weighing platform, and
   fixed guide means mounted on said support adjacent the discharge end of said weighing platform and over which said chain member is trained.

4. In a high speed checkweighing system, means for supporting endless conveyor means in such manner as to minimize deleterious vertical force component fluctuations due to changes in tension therein as articles are periodically discharged thereonto,
   said means for supporting including vertically movable weight sensitive platform means having a receiving end and a discharge end, and guide means fixed relative to said platform means adjacent the discharge end thereof,
   endless conveyor means having a horizontally disposed article-supporting flight portion,
   said platform means and said guide means constituting the sole support for said horizontal flight portion of the conveyor means to minimize deleterious vertical force component fluctuations as aforesaid,
   said endless conveyor means comprising at least one endless chain consisting of a series of hollow spheres joined together by link elements,
   the upper surface of said platform means having a guide groove therein from the receiving to the discharge end thereof receiving said spheres.

5. In a high speed checkweighing system,
   a frame,
   weighing means mounted on said frame and including a vertically movable weight sensitive platform having an article-receiving and an article-discharge end,
   drive means mounted on said frame beneath said platform,
   support means carried by said frame adjacent the article-discharge end of said platform,
   an endless chain member trained over the drive means, over the platform and support means to pass over the article-receiving end of said platform and issue from the article-discharge end thereof to pass over said support means and to pass therefrom back to the drive means,
   said chain member comprising a series of beads joined by link elements.

6. In a high speed checkweighing system,
   a frame,
   weighing means mounted on said frame and including a vertically movable weight sensitive platform having an article-receiving and an article-discharge end,
   drive means mounted on said frame beneath said platform,
   support means carried by said frame adjacent the article-discharge end of said platform,
   an endless chain member trained over the drive means, over the platform and support means to pass over the article-receiving end of said platform and issue from the article-discharge end thereof to pass over said support means and to pass therefrom back to the drive means,
   said chain member comprising a series of beads joined by link pin elements, and
   means carried by said frame guiding said chain member to pass substantially in straight line fashion between said support means and said drive means.

7. A system for accurately checkweighing articles of manufacture as the same are transported at high linear velocity, comprising in combination,
   weighing means including a substantially horizontal weight-sensitive platform having a receiving end and a discharge end,
   drive means located below the elevation of said platform,
   a fixed guide member located at the discharge end of said platform and at the elevation thereof,
   a conveyor member trained over the receiving end of said platform, along the upper surface thereof and passing therefrom over said fixed guide member to engage with said drive means and pass therefrom to said receiving end of the platform, said conveyor member comprising a member in the form of an endless loop having longitudinally spaced enlarged bead portions joined by narrow link portions, whereby said loop is flexible in any direction, and means on said platform for laterally guiding said conveyor element.

References Cited in the file of this patent
UNITED STATES PATENTS

| | | |
|---|---|---|
| 2,701,639 | Petrea | Feb. 8, 1955 |
| 2,768,657 | Kindseth | Oct. 30, 1956 |
| 2,868,413 | Vossen | Jan. 13, 1959 |
| 2,889,031 | Hopkins et al. | June 2, 1959 |
| 2,941,793 | Grant | June 21, 1960 |
| 3,019,884 | Bartelt | Feb. 6, 7962 |
| 3,070,214 | Del Rosso | Dec. 25, 1962 |